(12) United States Patent
Funk et al.

(10) Patent No.: US 10,261,999 B2
(45) Date of Patent: Apr. 16, 2019

(54) SEARCHING MULTIMEDIA BASED ON TRIGGER EVENTS

(71) Applicant: ROKU, INC., Los Gatos, CA (US)

(72) Inventors: Jim Funk, Los Altos, CA (US);
Brandon Noffsinger, Colorado Springs, CO (US)

(73) Assignee: ROKU, INC., Los Gatos, CA (US)

( * ) Notice: Subject to any disclaimer, the term of this patent is extended or adjusted under 35 U.S.C. 154(b) by 15 days.

(21) Appl. No.: 15/343,426

(22) Filed: Nov. 4, 2016

(65) Prior Publication Data
US 2017/0124076 A1    May 4, 2017

Related U.S. Application Data

(63) Continuation of application No. 14/536,339, filed on Nov. 7, 2014, now Pat. No. 9,519,645, which is a
(Continued)

(51) Int. Cl.
| H04N 5/445 | (2011.01) |
| G06F 17/30 | (2006.01) |
| H04N 21/2387 | (2011.01) |
| H04N 21/41 | (2011.01) |
| H04N 21/466 | (2011.01) |
| H04N 21/472 | (2011.01) |

(Continued)

(52) U.S. Cl.
CPC .... *G06F 17/30038* (2013.01); *G06F 17/3005* (2013.01); *G06F 17/30023* (2013.01); *G06F 17/3051* (2013.01); *G06F 17/30864* (2013.01); *G06F 17/30867* (2013.01); *H04N 21/237* (2013.01); *H04N 21/2387* (2013.01); *H04N 21/4126* (2013.01); *H04N 21/4668* (2013.01); *H04N 21/47208* (2013.01); *H04N 21/47217* (2013.01); *H04N 21/4828* (2013.01); *H04N 21/8405* (2013.01)

(58) Field of Classification Search
CPC ......... H04N 21/4586; H04N 21/47202; H04N 21/4828
See application file for complete search history.

(56) References Cited

U.S. PATENT DOCUMENTS 6,331,877 B1 * 12/2001 Bennington .......... A63F 13/338
                                                        3/338
2003/0088687 A1 * 5/2003 Begeja ............... H04N 7/17318
                                                        709/231
(Continued)

*Primary Examiner* — Pankaj Kumar
*Assistant Examiner* — Timothy R Newlin
(74) *Attorney, Agent, or Firm* — Sterne, Kessler, Goldstein & Fox P.L.L.C.

(57) ABSTRACT

A system and method for intelligent content searching is disclosed herein. The system saves all searches executed by the user and periodically re-executes one or more of the previously saved searches and display the subsequent search results to the user at an appropriate time without any user intervention. In one aspect, the system periodically re-executes one or more of the previously saved searches upon the occurrence of a trigger event, which may be trending events, news events, type of menus and/or screens accessed, new content being added on one or more service providers, a boot event, passage of time since last search, etc. In this way, users do not need to set alert or follow any search topic.

20 Claims, 11 Drawing Sheets

Related U.S. Application Data continuation-in-part of application No. 13/778,068, filed on Feb. 26, 2013, now Pat. No. 9,137,578, which is a continuation-in-part of application No. 13/431,932, filed on Mar. 27, 2012, now abandoned.

(51) Int. Cl.
*H04N 21/482* (2011.01)
*H04N 21/237* (2011.01)
*H04N 21/8405* (2011.01)

(56) References Cited

U.S. PATENT DOCUMENTS

| | | | | |
|---|---|---|---|---|
| 2004/0078816 | A1* | 4/2004 | Johnson | H04N 5/44543 725/52 |
| 2004/0098747 | A1* | 5/2004 | Kay | H04N 5/44543 725/95 |
| 2006/0235885 | A1* | 10/2006 | Steele | G06F 17/30867 |
| 2006/0236243 | A1* | 10/2006 | Brain | H04N 7/17336 715/704 |
| 2007/0097975 | A1* | 5/2007 | Rakers | G06Q 30/0241 370/392 |
| 2007/0130126 | A1* | 6/2007 | Lucovsky | G06F 17/30864 |
| 2007/0130610 | A1* | 6/2007 | Aarnio | H04H 40/27 725/134 |
| 2007/0188665 | A1* | 8/2007 | Watson | H04N 5/4401 348/731 |
| 2007/0266401 | A1* | 11/2007 | Hallberg | H04N 7/17318 725/46 |
| 2008/0083003 | A1* | 4/2008 | Biniak | G11B 27/28 725/110 |
| 2009/0228937 | A1* | 9/2009 | Williams | H04N 7/16 725/86 |
| 2009/0239514 | A1* | 9/2009 | Kenagy | H04H 20/106 455/414.3 |
| 2009/0327892 | A1* | 12/2009 | Douillet | H04L 12/2812 715/717 |
| 2010/0153885 | A1* | 6/2010 | Yates | G06F 3/0482 715/841 |
| 2011/0023068 | A1* | 1/2011 | Zeldis | H04N 5/44543 725/61 |
| 2011/0289530 | A1* | 11/2011 | Dureau | H04N 21/4622 725/38 |
| 2011/0314084 | A1* | 12/2011 | Saretto | G06F 17/30867 709/203 |
| 2012/0192217 | A1* | 7/2012 | Jeong | H04N 21/252 725/14 |
| 2013/0074109 | A1* | 3/2013 | Skelton | H04H 20/00 725/14 |
| 2013/0133007 | A1* | 5/2013 | White | H04N 5/782 725/53 |
| 2013/0174035 | A1* | 7/2013 | Grab | G06F 3/04842 715/716 |
| 2013/0239024 | A1* | 9/2013 | Lewis | H04N 7/147 715/756 |
| 2013/0268975 | A1* | 10/2013 | Korst | G06F 17/30828 725/53 |
| 2014/0201802 | A1* | 7/2014 | Boss | H04N 21/4263 725/134 |
| 2015/0339312 | A1* | 11/2015 | Lin | G06F 17/30545 707/666 |
| 2016/0127763 | A1* | 5/2016 | Patel | H04N 21/4312 348/564 |

* cited by examiner

SEARCHING MULTIMEDIA BASED ON TRIGGER EVENTS

CROSS-REFERENCE TO RELATED APPLICATIONS

This is a continuation of patent application Ser. No. 14/536,339 entitled "Method and Apparatus for Sharing Content", filed Nov. 7, 2014 which is a continuation in part of patent application Ser. No. 13/778,068, entitled "Method and Apparatus for Sharing Content", filed Feb. 26, 2013, which is a continuation in part of patent application Ser. No. 13/431,932, entitled "Method and Apparatus for Sharing Content", filed Mar. 27, 2012, all of which are incorporated herein by reference in their entireties.

FIELD

Various embodiments of the invention relate to systems and methods for providing information about multimedia or television programs such as sports, news, TV shows, music, documentaries, and movies, etc. to user.

BACKGROUND

The number of television programs available to users have dramatically increased over the years. Today there are numerous streaming services that offer thousands of video on demand (VOD) programs. Even traditional cable networks like ABC, CBS, and NBC have started their own streaming services in their efforts to capture the users' attention and loyalty. In addition to all of the available VOD programs, there are also numerous broadcast programs that are available to the users. Consequently, users now face a sea of readily available programs in which they have to wade through in order to find something to watch. One way to help users discover programs to enjoy is to provide a search feature, which is commonly available on all cable, satellite, and streaming systems.

The traditional search feature is helpful in narrowing down the choices of programs from which the user can select. However, often times, the search results are not helpful because the particular program the user is searching for is not yet available on certain channel or service provider to which the user has a subscription. When this occurs, the user usually gives up and forgets about the search. Accordingly, there is a need for a better searching tool that help users discover programs relevant to their initial search on a continuing basis.

SUMMARY OF THE INVENTION

In traditional systems, a search is typically performed only once (at the time of request) unless the user specifically instructs the system to "follow" the search topic or creates an alert for the search. As the collection of available VODs continue to grows, the traditional search process will be less helpful as there is a lack of built-in intelligence to help sort through the flood of available VODs. Accordingly, a system and method for intelligent content searching is disclosed herein. The method includes: receiving at least one keyword from a client device; performing a first search for content using the at least one keyword; sending a first search results of the first search to a user device for display; automatically storing the at least one keyword; automatically performing a subsequent search using the stored at least one keyword upon the occurrence of a trigger event; and automatically sending a subsequent search results of the subsequent search to the user device for display.

A trigger event may be a boot event at the client device, a news event, and passage of a predetermined amount of time since the first search, type of menus or screens accessed by the user at the client device, new content(s) being made available to one or more of the remote multimedia servers or streaming providers, etc. The trigger event adds intelligence to the system and provides the system a cue when to re-execute one or more of the previously saved searches. In this way, the system would not flood the user with unwanted recommendations. The client device may be the main display device such as a television. The user device may be a secondary device such as a tablet. In one aspect, the client and user device is the same device. In another aspect, the client and user devices are different devices.

In yet another aspect, a non-transitory processor-readable medium is provided, the storage medium having one or more instructions operational on a client device, which when executed by a processor causes the processor to: receive at least one keyword from a client device; perform a first search for content using the at least one keyword; send a first search results of the first search to a user device for display; automatically store the at least one keyword; automatically perform a subsequent search using the stored at least one keyword; and automatically send a subsequent search results of the subsequent search to the user device for display.

In yet another aspect, method for searching content is disclosed. The method includes: sending at least one keyword to a remote server; receiving a first search results based on the at least one keyword; displaying the first search results on a display screen of a local device; without user intervention, receiving a subsequent search results based on the at least one keyword; and automatically displaying the subsequent search results on the display screen of a user device.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Today, more and more people are eliminating their cable and satellite services altogether to go with streaming solutions such as the Roku streaming player. The streaming option is attractive to many people for a variety of reasons including it being a cheaper alternative to cable/satellite television and the instant accessibility to thousands of programs across many different streaming platforms and providers such as Roku® channels, Netflix®, HBO GO, and Hulu®, for example. Additionally, the required investment on hardware is minimal and sometime even free as the streaming software application is preloaded onto many devices.

Figure 1:
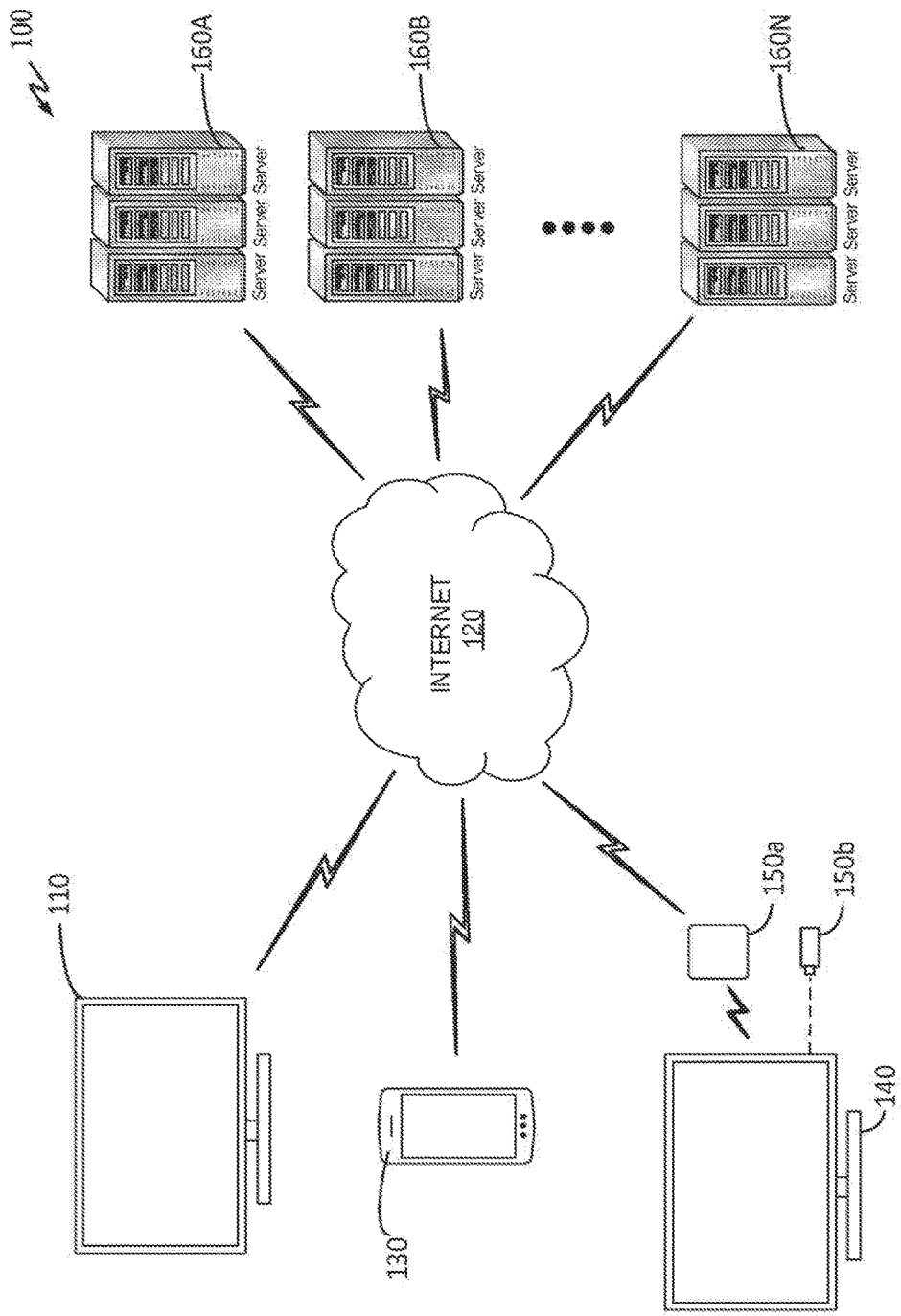
FIG. 1 illustrates an exemplary streaming environment.

FIG. 1 illustrates an exemplary streaming environment 100 common to most streaming systems. As shown in FIG. 1, environment 100 includes a television 110 such as a LED flat screen TV, the Internet 120, a user device 130 such as a mobile phone or tablet, a display device 140, streaming client devices 150a-b, and a plurality of servers 160A-160N. Television 110 may be an Internet enabled smart TV having preloaded streaming applications such as the Roku streaming application or Roku TV. For example, TCL® and Hisense® brands televisions include Roku TV right out of the box, thus enabling users to immediately stream programs from a selection of more than 1000+ channels straight to their televisions without the need to purchase any additional hardware or software. Once the streaming application (e.g., Roku TV) is executed, it communicates with one or more content servers 160A-N via Internet 120 to request and receive streaming program for display on television 110.

User device 130 may be a smartphone, a tablet, or any other suitable mobile devices with the ability to access the Internet or broadband wireless such as 4G LTE, 5G, or any other suitable wireless communication standard. User device 130 may include a streaming application such as Roku mobile App (not shown) to enable it to stream programs from one or more servers 160a-n via the Internet to user device 130, television 110, or display device 140.

Streaming programs may also be delivered to a display device such as display device 140 using a streaming player 150a or streaming stick 150b. Each of streaming player 150a and streaming stick 150b is connected to an audio/video input (e.g., HDMI, MHL) of display device 140. In this set up, all of the software applications needed for streaming and video decoding reside on streaming player 150a or streaming stick 150b. An exemplary streaming player 150a is the Roku 3, and an exemplary streaming stick 150b is the Roku Streaming Stick.

Figure 2:
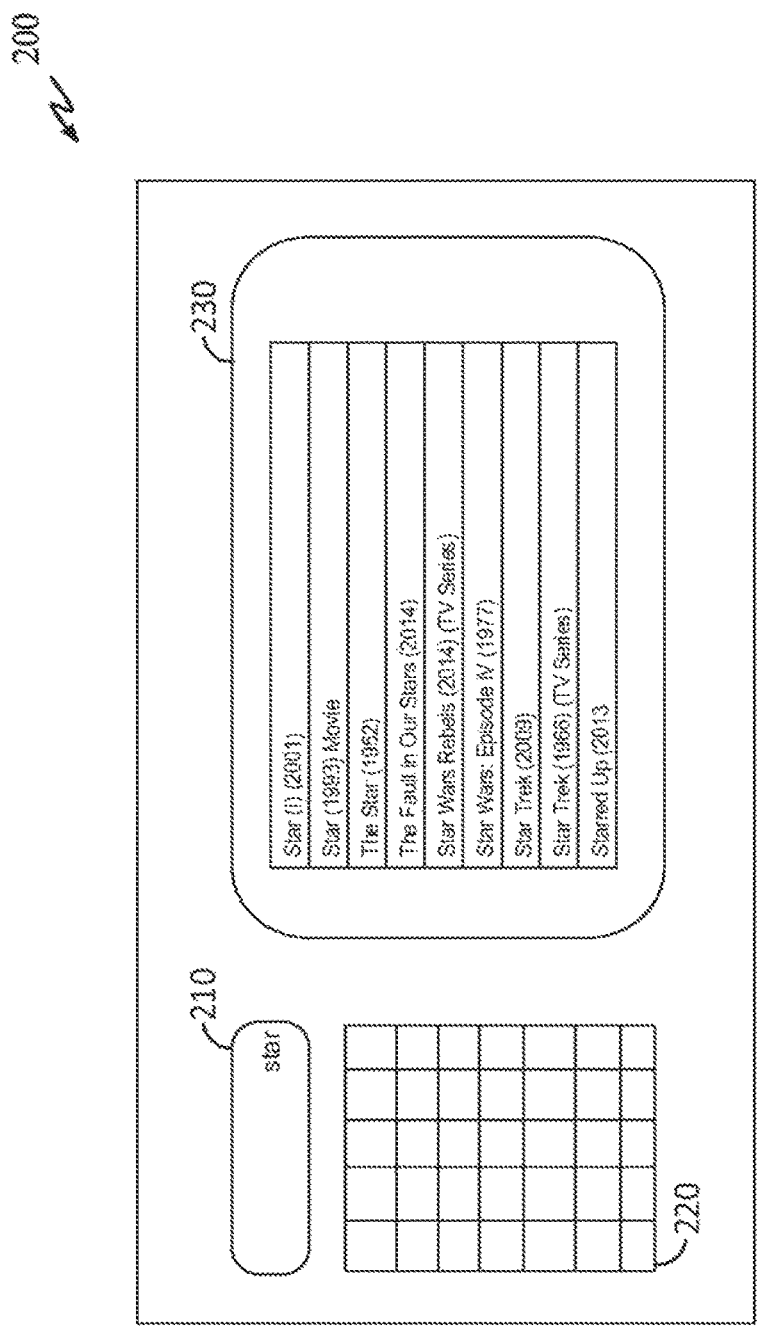
FIG. 2 illustrates an exemplary search interface.

FIG. 2 illustrates a traditional search screen or interface 200 implemented by various smart TVs, electronic program guides (EPGs), and streaming applications. Search interface 200 is typically displayed when the user selects the search function of a media application (not shown). The term media application refers to any software application such as EPG application on set top boxes, smart TV applications, Internet media websites, streaming applications, etc. Search interface 200 includes a keyword entry field 210, a keypad 220, and a search results display area 230. To perform a search, the user simply inputs one or more keywords into entry field 210 using keypad 220. Once the user entered the keyword(s), the media application (where the search function is called) sends the keyword(s) to a remote server such as server 160a, where the actual search for programs using the keyword(s) is performed. Once the search is completed by the remote server, the search results is sent to the media application for display in search results display area 230.

In certain system, the keywords of previous searches are saved by the media application and are displayed to the user to allow the user to reselect the previous keywords and re-perform the search by sending the selected keywords to the remote search server. If however, previous keywords are not saved by the media application, then the user would have to reenter the search keyword each time the user wants to perform a search. Even for an advanced system where keywords of previous searches are saved, the user is still required to manually perform the search by re-sending the search keywords to the remote server for searching.

Persistent Searching

Figure 3:
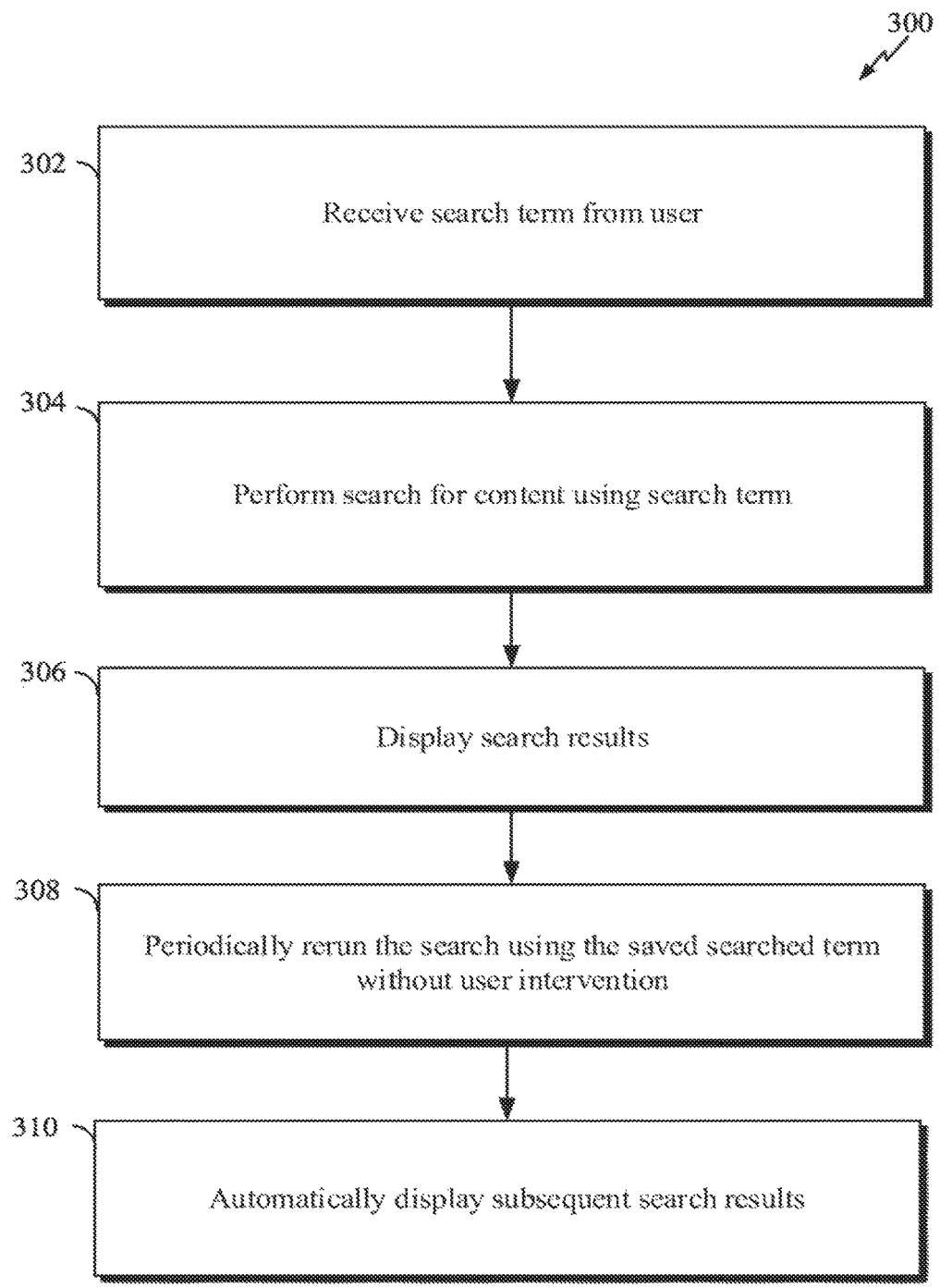
FIG. 3 illustrates an exemplary process for persistent searching in accordance to an aspect of the disclosure.

FIG. 3 illustrates an exemplary system's process 300 for performing persistent searches in accordance to an aspect of the disclosure. Persistent search process 300 enables the user to perform a search just once and the system will periodically re-run the same search to look for new content without any user intervention. In traditional searching systems, the user either have to re-run a previous search or expressly select a follow feature on a program in order to receive new search results. As shown in FIG. 3, persistent search process 300 starts at 302 where the search term is received from the user. The search term may have one or more keywords which is entered by the user using keypad 220 or by voice recognition. Once the search term is entered into the media application, it is then sent to the remote media server to perform the searching. Alternatively, the media application may be configured to use local resources to perform the search locally. In this particular aspect, the local device may search for contents on various remote servers and aggregate the results locally. At 304, a search is perform using the search term entered by the user. At 306, the search results is displayed on a display screen such as television 110, mobile device 130, and display device 140. At 308, the search term is saved and is periodically re-ran without any user intervention. In this way, the user does not have to perform a follow on the search term or inform the system to rerun the search. At 310, the results of a subsequent search is displayed to the user.

Figure 4:
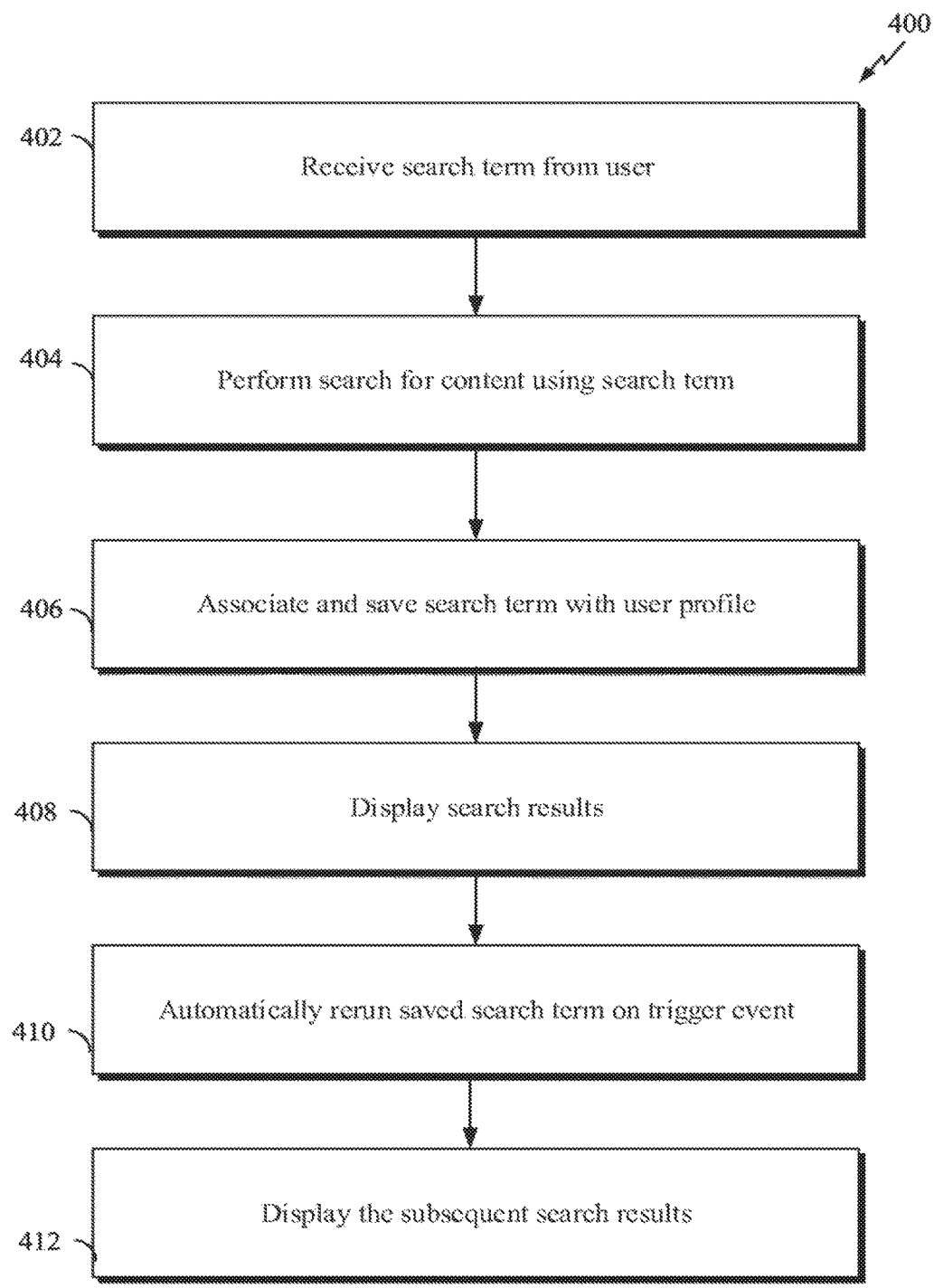
FIG. 4 illustrates an exemplary process for persistent searching based on a trigger event in accordance to an aspect of the disclosure.

FIG. 4 illustrates an exemplary system's process 400 for performing persistent searches in accordance to an aspect of the disclosure. At 402, the search term generated by the user is received. At 404, the search for contents or multimedia programs is performed using the received search term. At 406, the search term is optionally associated with the user's profile in order to build an accurate profile of the user's interest. At 408, the search results is displayed to the user. At 410, the search is automatically re-executed upon an occurrence of a trigger event. In one aspect, search on one or more of the previous search terms is re-executed. The trigger event may be the amount of time since the last search was executed. For example, process 400 may schedule the search to be re-executed every week or month and display the subsequent search results to the user. In one aspect, the results of the original search and results of subsequent searches can be visually displayed (at 412) in a timeline format. In this way, the user is able to quickly distinguish which contents are new in the search results.

In another aspect, the trigger event may be a boot event at the local device. In response to a boot cycle (e.g., power on, restart), block 410 is repeated to automatically rerun the saved search. User's behaviors may also be trigger events. For example, the system may detect that the user has been browsing various channels for a long time without playing any content. This could indicate that the user is lost within the abundant choices of available programming and perhaps guidance is needed. In this situation, process 400 may automatically rerun one or more of the saved search terms upon occurrence of a trigger event and display the subsequent search results (at 412) to the user as a recommendation. It should be noted that the system may rerun multiple searches using independently saved search term(s) for a single trigger event.

Trigger events may also be assigned to certain screens or menu functions. For example, a trigger event may be assigned to the search screen, social network functions (e.g., tweeting, facebook posting, etc.), or to a certain channel. In one aspect, when the system associates a search term to a user profile (at 406), other information such as channel, date, time, may also be associated to the search term. In this way, when the user access the Disney® channel, for example, the system may automatically rerun one or more previously saved searches relating to Disney such as previous searches for frozen, maleficent, Angelina Jolie, etc. In another aspect, whenever the user enters the search screen via the search menu, the system may automatically rerun one or more of the previous searches and display the results before any new search is executed.

Figure 5:
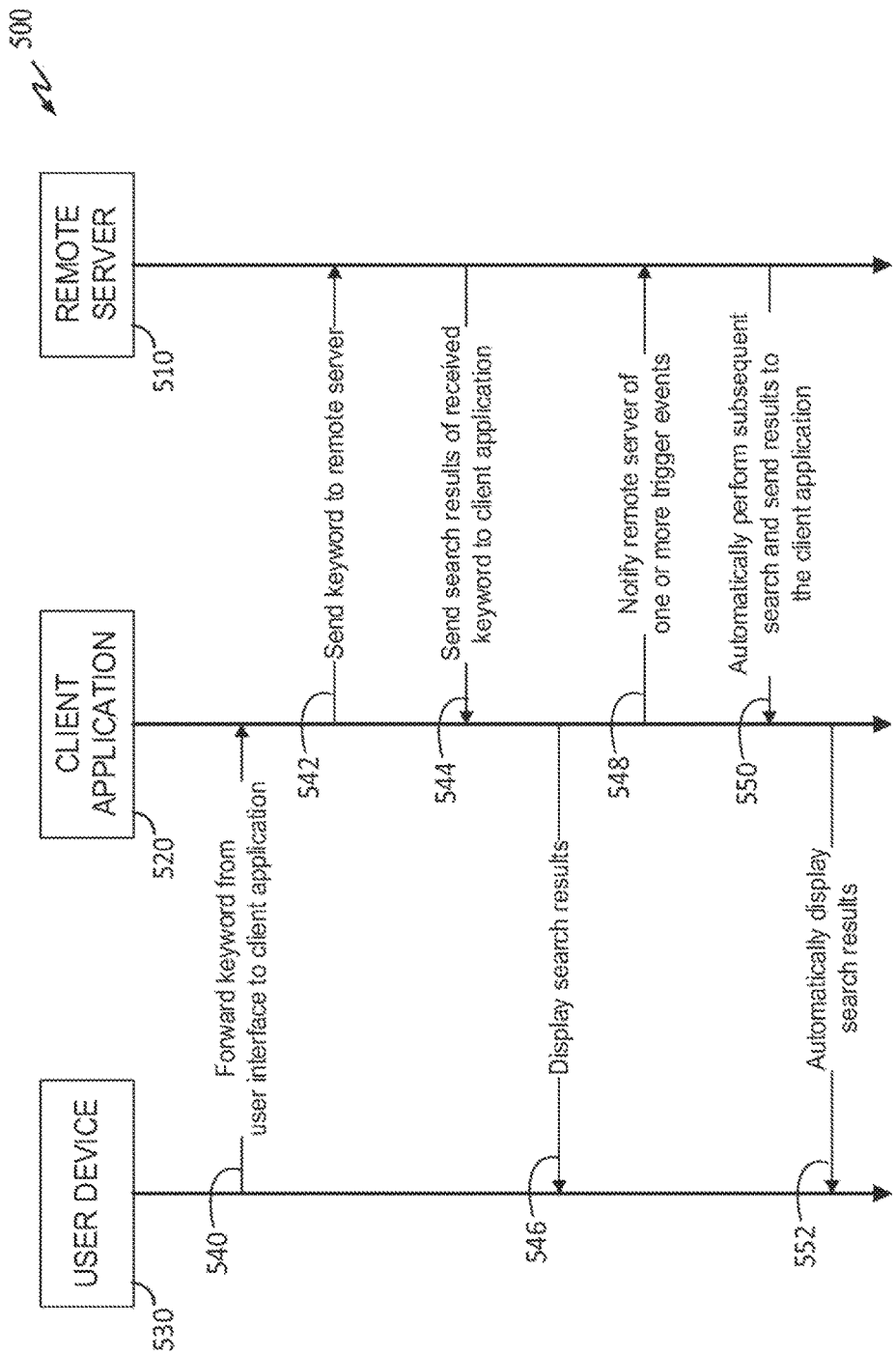
FIG. 5 illustrates an exemplary communication process between devices of a system for searching multimedia content in accordance to an aspect of the disclosure.

FIG. 5 illustrates the communication process between various devices of a searching system 500 in accordance to one aspect of the disclosure. System 500 includes a remote server 510, a client application 520, and a user device 530. Client application 520 may be part of a standalone device such as streaming player 150a or streaming stick 150b. Alternatively, client application 520 may be installed in user device 530, which may be a smart TV, a smartphone, or tablet. At 540, one or more keywords from user device 530 input interface (such as interface 210) is read by client application. At 542, the client application sends the keyword to remote server 510. At 544, the remote server performs a search using the received keyword and sends the search results back to client application 520. The keyword may also be saved by remote server 510 at 544. At 546, the client application causes user device 546 to display the search results. At 548, client application 520 detects one or more trigger events and requests remote server 510 of the trigger events. At 550, based on the type of trigger events, remote server 510 automatically performs a search using the one or more of the previously saved searches and keywords. For example, if the trigger event is the user selecting a sports channel, remote server 510 may rerun previous searches on the sports movies, football, or Babe Ruth. At 552, the search results for the one or more searches are displayed at user device 530. In one aspect, the trigger event is generated by remote server 510 whenever it detects new content relevant to one of the saved searches.

Figure 6:
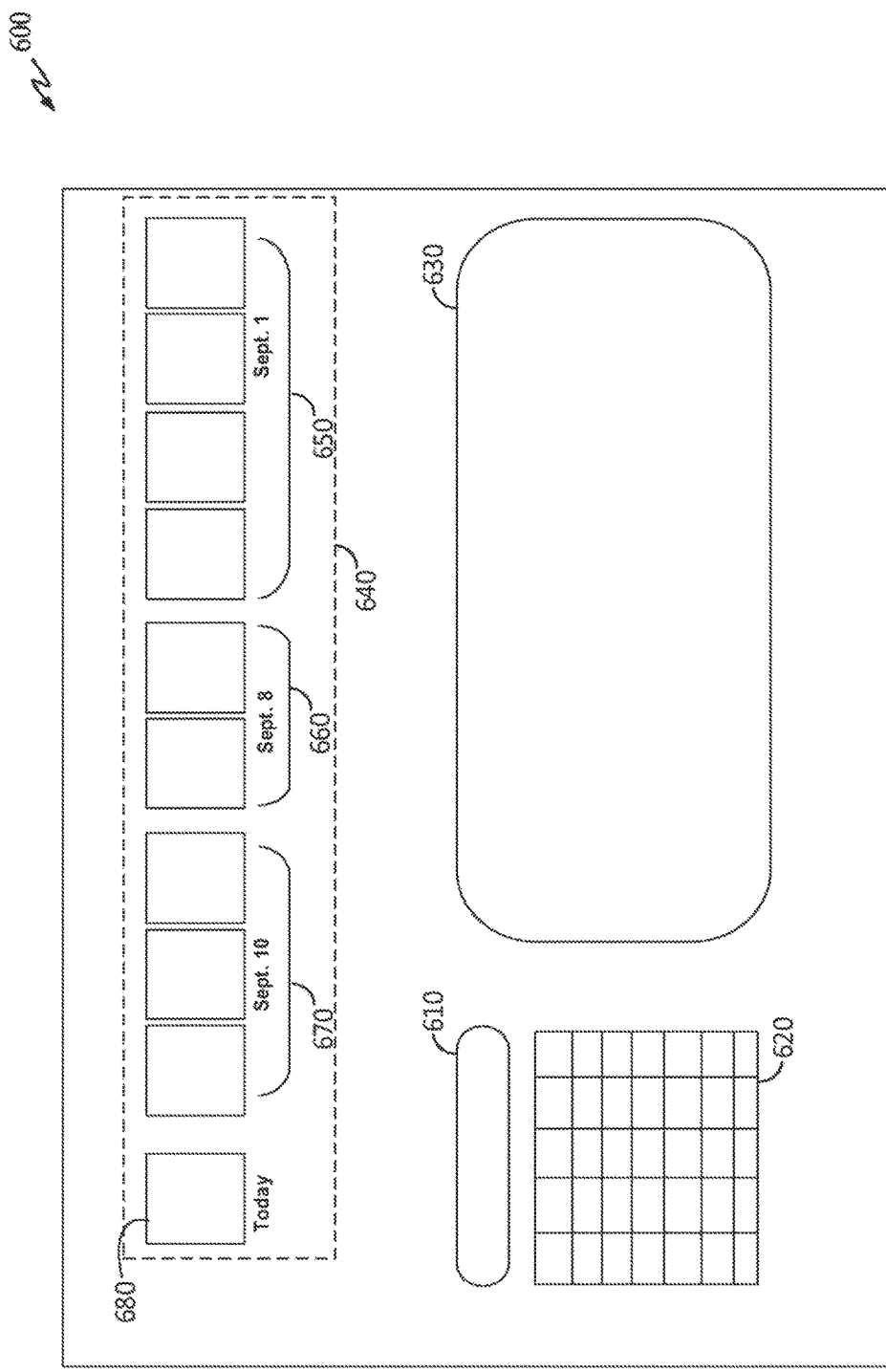
FIGS. 6-9 illustrate exemplary user interfaces of systems for searching for multimedia content in accordance to an aspect of the disclosure.

FIG. 6 illustrates an exemplary search interface 600 in accordance to one aspect of the disclosure. Search interface 600 includes traditional graphical user interface (GUI) objects such as an input field 610, a keypad 620, and a search results display area 630. In addition to the traditional GUI objects, search interface 600 also includes a persistent search results area 640, which is made up of a plurality of panels 650-680 positioned in a timeline based manner. Panels 650-680 are visual representation of search results performed on September 1, September 8, September 10, and the current date, respectively, using one of the previously saved searches. In one aspect, the default previous search used to automatically perform another search is the last search the user conducted. Alternatively, the default previous search could be based on the user profile. For example, the default previous search could be based on the user's interest in foods, golf, movie genre, etc. In one aspect, the user profile could override the last search conducted. In this scenario, the user may conduct a one off search on a person in the news, but because that person has no relation to the user's interest (per the user's profile), the last search is ignored and would not be used to generate the search results for display in the persistent search area 640.

As shown in FIG. 6, the plurality of panels 650 are the top or most relevant search results conducted on September 1. In one aspect, every time a trigger event occurred, another search is performed and displayed in persistent search display area 640. One of the trigger events can be the activation of a search screen/function such as search screen 600. In this way, each time the user enters or activates search interface 600, a new search is automatically conducted and displayed in area 640. Panels 660 and 670 are from searches conducted on September 8 and 10, respectively. Similarly, panel 680 show the most relevant search result that was rerun today. In one aspect, search interface 600 includes a plurality of persistent search areas shown as multiple rows of panels (not shown). Each of the persistent search areas has its own unique search terms that were previously used to conduct searches.

Figure 7:
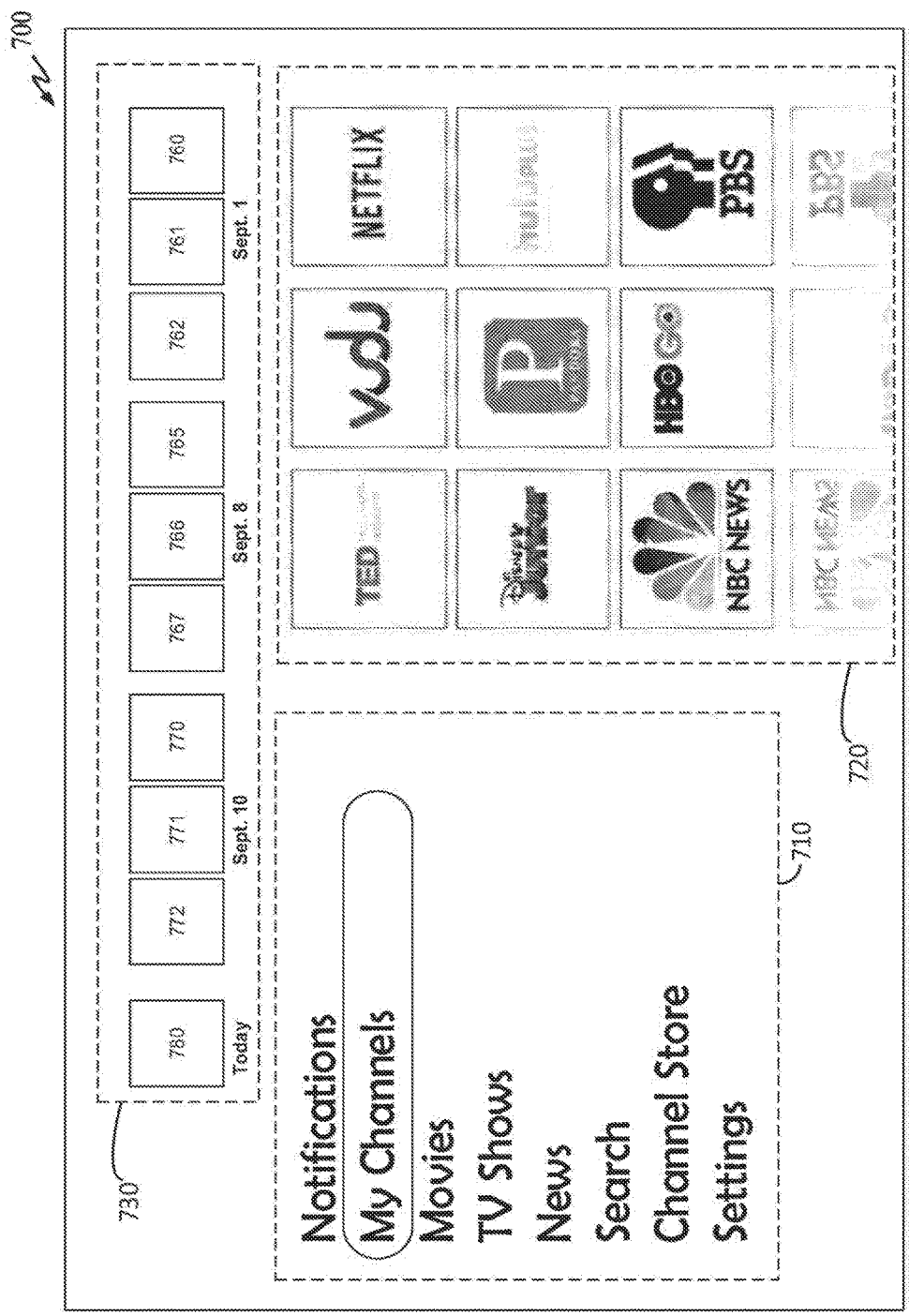

FIG. 7 illustrates an exemplary user interface 700 in accordance to one aspect of the disclosure. User interface 700 includes a menu selection area 710, a main display area 720, and a persistent search display area 730, which includes a plurality of search results 760-780 on various dates. User interface 700 allows the user to navigate the home screen menus and at the same time to view the latest search results (780) of a previous search in display area 730. It is important to note that searches conducted to populate persistent search display area 730 are conducted automatically using one or more of previously saved searches and no user input is involved. Additionally, the automatic search may be conducted based on the occurrence of a trigger event. In one aspect, the trigger event may be based on an external event such as a news event or a trending event. For example, the user may have previously conducted a search on the term Amadeus and find nothing. However, if the a child prodigy playing a Mozart concerto made national news and thereby generated a lot interests on Mozart, the movie Amadeus may suddenly be made available by one of the streaming providers. In such a scenario, the combination of the persistent search display area 730 and trigger event and helps the user discover contents relevant to the user's interests.

Figure 8:
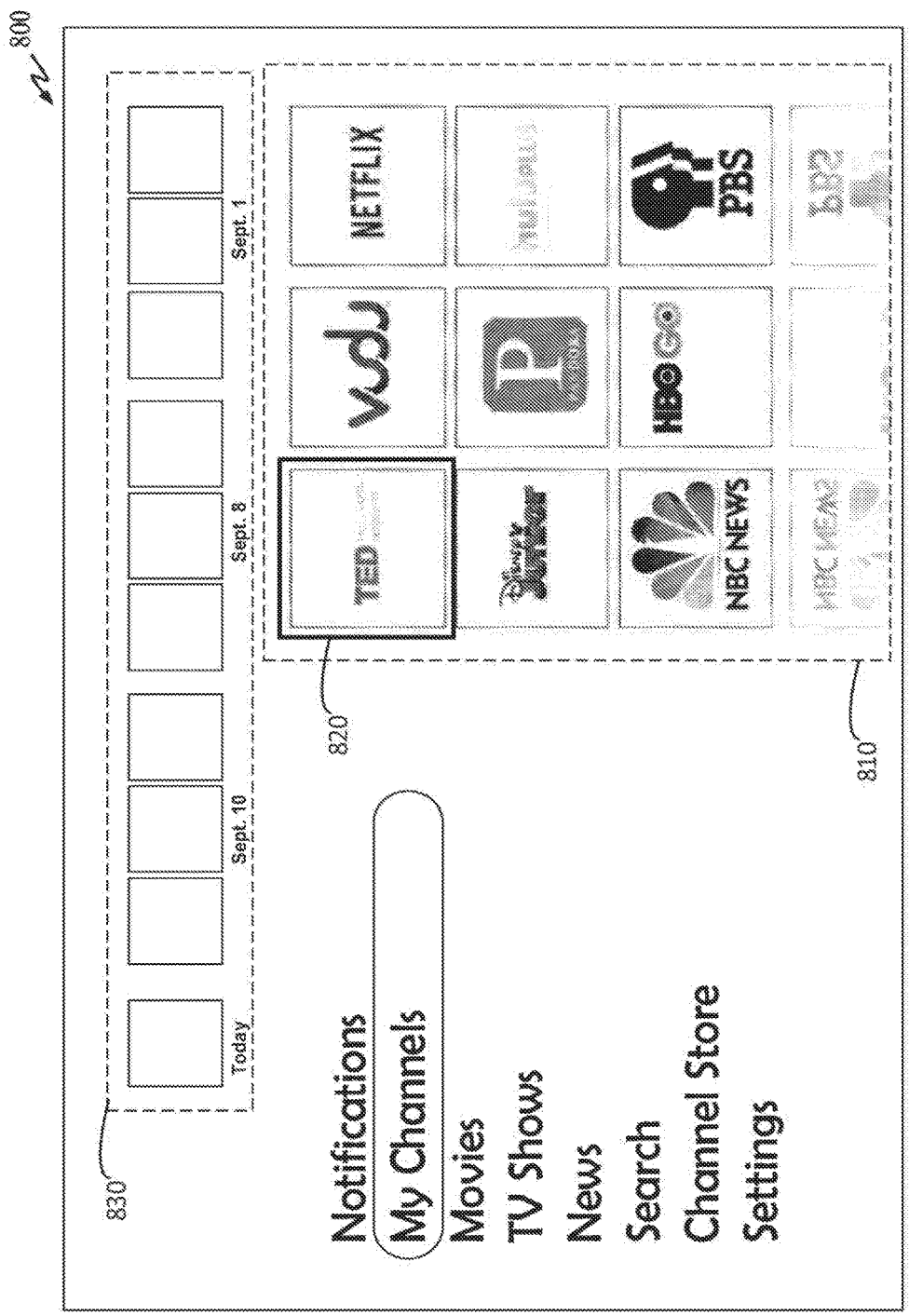

FIG. 8 illustrates an exemplary user interface 800 in accordance to one aspect of the disclosure. User interface 800 is similar to user interface 700 in that it also includes a menu area, a main display area 810 and a persistent search display area 830. As shown in FIG. 8, the channel TED is selected by the user as indicated by highlighted area 820. In one aspect, the trigger event is tied to the specific channel the user has selected. Over a long period of use of the system, the user may have performed numerous searches across a disparate types of genres and topics. In this case, it might be difficult to select one of the previously saved search for researching and displaying in display area 830. By associating the search to a channel the user has selected, the system can substantially reduce the number of previously saved searches to select from by weeding out searches that are irrelevant to the channel selected. For example, any previous searches on sports or fashions may be eliminated because they have a very low probability of being relevant to any talks and shows available on the TED channel. Conversely, previous searches on a science personality, an entrepreneur celebrity, or a Nobel Prize winner will likely be selected by the system for persistent searching as they are relevant to the TED channel.

Figure 9:
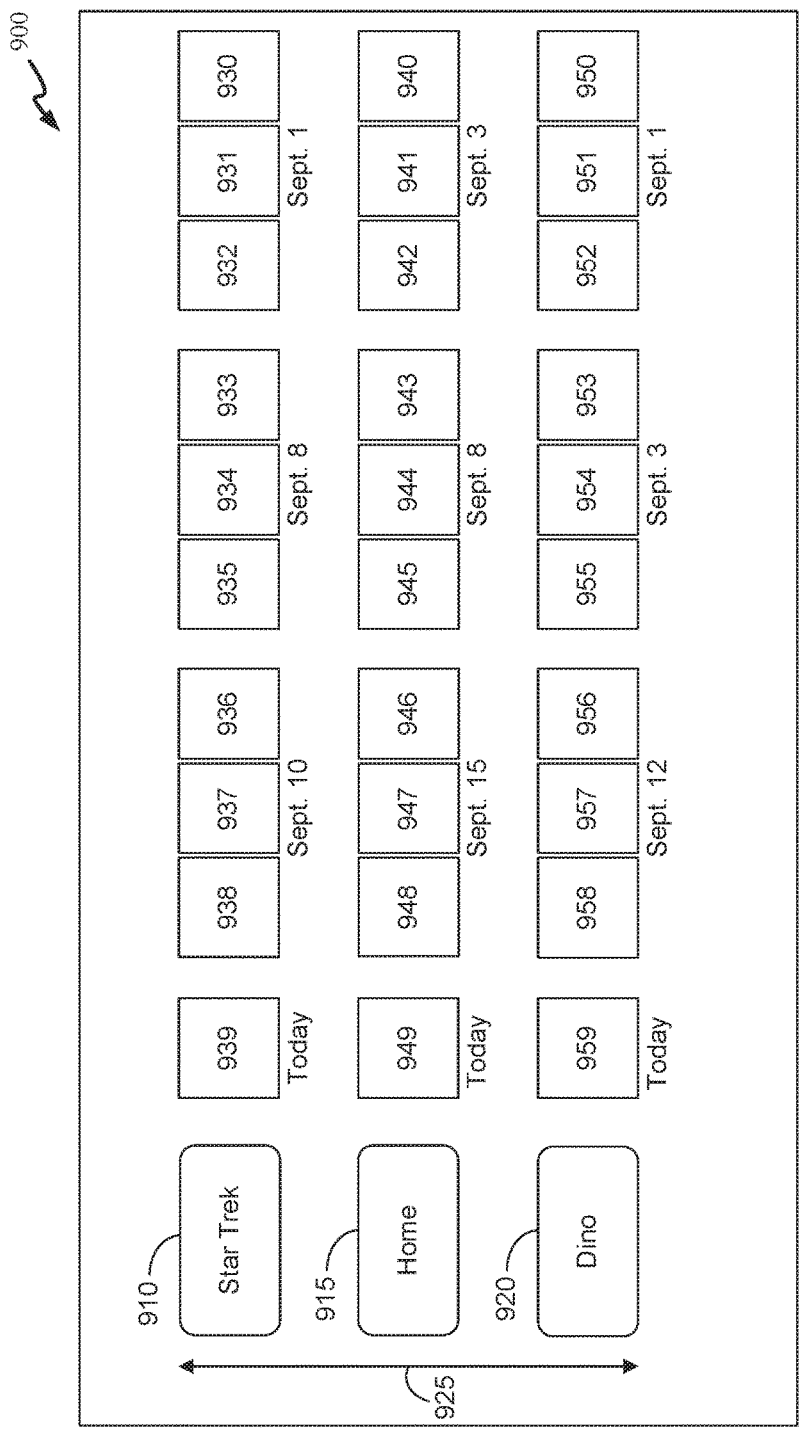

FIG. 9 illustrates an exemplary user interface 900 in accordance to one embodiment of the disclosure. User interface 900 includes a plurality of rows, each row having a plurality of panels displaying search results from a persistent search. Each of interface objects 910, 915, and 920 represents one of the previous search terms. Panels 930-939 contain search results for persistent search of the search term in object 910, "Star Trek". Panels 940-949 contain search results for persistent search of the search term in object 915, "Home". Similarly, panels 950-959 contain search results for persistent search of the search term in object 920, "Dino". User interface also includes scroll bar 925, which allows the user to scroll through various search terms performed in the past. When scrolling through the list of past searches, the system would update the persistent search row by populating panels 939, 949, and 959, for example.

As shown in FIG. 9, each row of panels are displayed in a timeline format. Although only one panel is shown under "Today", the results may yield two or more panels. Additionally, old panels from the oldest dates would scroll off the row as panels from new search from today are added. Additionally, user interface 900 may be implemented on the main display screen or only on the secondary screen while the search menu is displayed on the main display screen.

Figure 10:
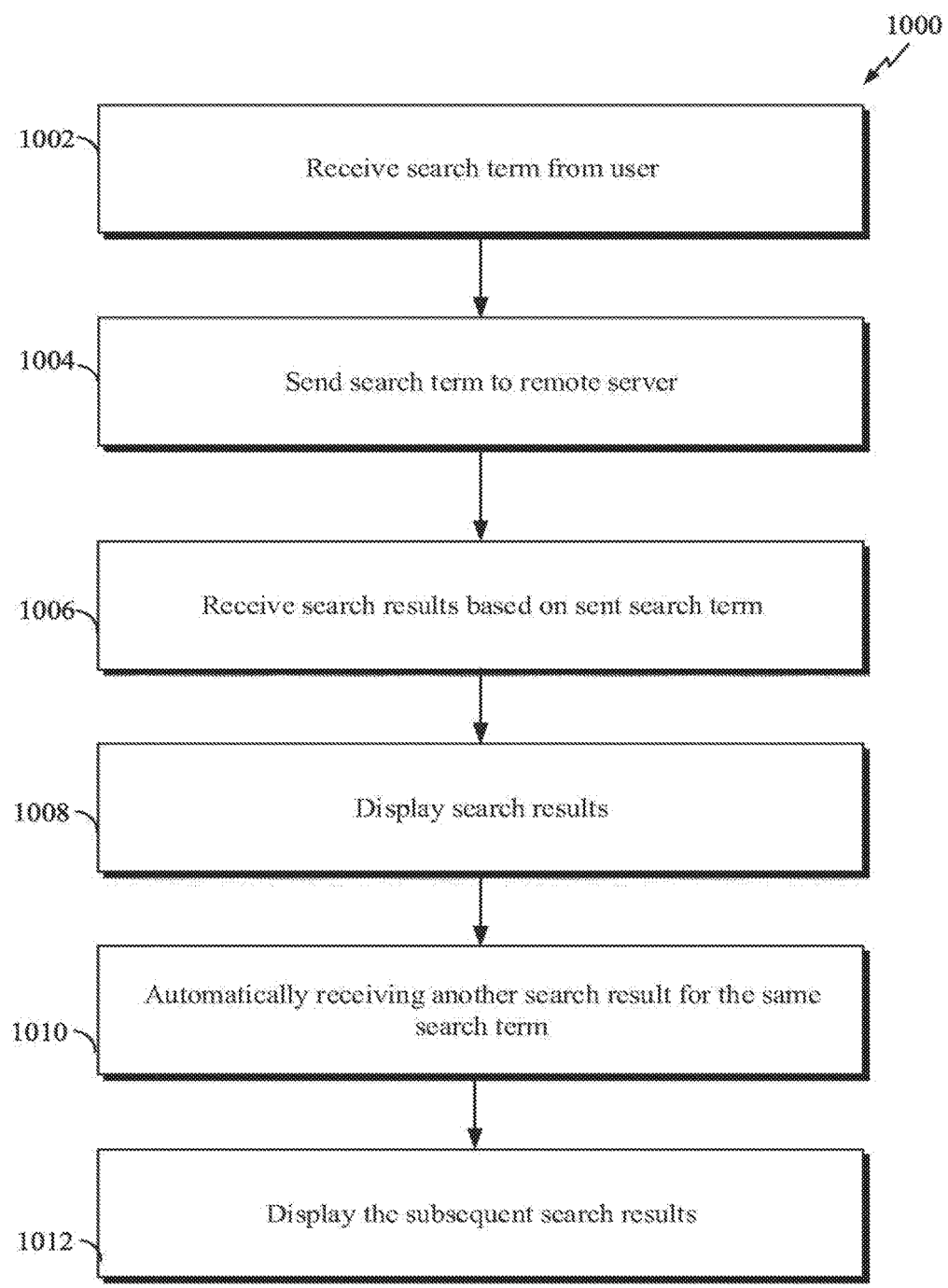
FIG. 10 illustrates an exemplary process for persistent searching in accordance to an aspect of the disclosure.

FIG. 10 illustrates an exemplary process flow 1000 on a user device in accordance to one aspect of the disclosure. Process flow 1000 begins at 1002 where a search term is received from the user. Typically is done via a keypad. Alternatively, voice recognition can be used. At 1004, the search term received at 1002 is sent to the remote server. At 1006, in response to sending the search term to the remote server, the search results is received at the user device. At 1008, the search results are displayed. At 1010, another search results is automatically received at the user device. In one aspect, the subsequent search results is automatically received (sent by remote server) upon the occurrence of a trigger event. At 1012, the search results of the subsequent search is displayed.

Exemplary Hardware Implementation

Figure 11:
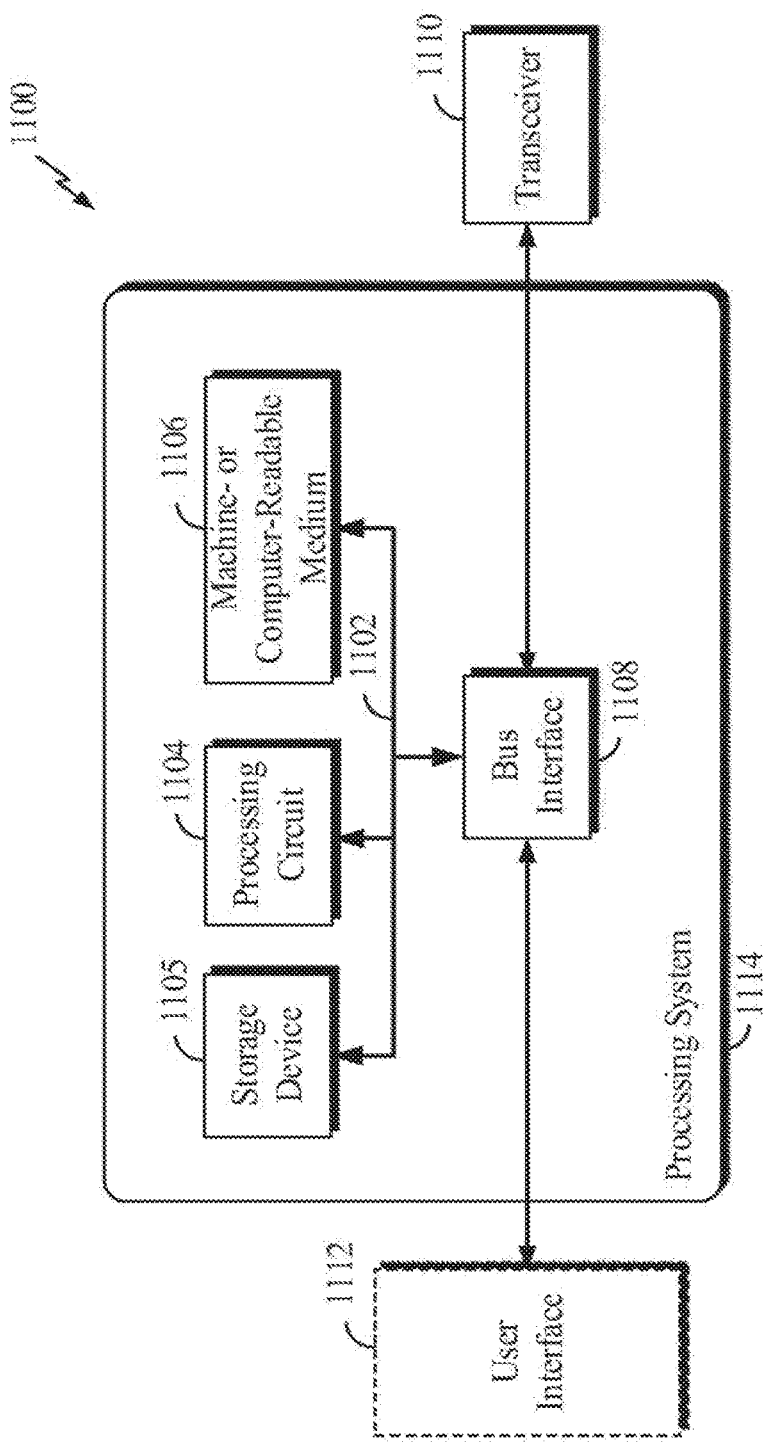
FIG. 11 is a block diagram illustrating an example of a hardware implementation for an apparatus employing a processing system that may exploit the systems and methods of FIGS. 3-10 in accordance to an aspect of the disclosure.

FIG. 11 illustrates an overall system or apparatus 1100 in which the systems, methods and apparatus of FIGS. 1-10 may be implemented. In accordance with various aspects of the disclosure, an element, or any portion of an element, or any combination of elements may be implemented with a processing system 1114 that includes one or more processing circuits 1104. Processing circuits 1104 may include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1104, as utilized in the apparatus 1100, may be used to implement any one or more of the processes described above and illustrated in FIGS. 3, 4, and 10 such as processes for persistently searching for content using previously save searches.

In the example of FIG. 11, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links various circuits including one or more processing circuits (represented generally by the processing circuit 1104), the storage device 1105, and a machine-readable, processor-readable, processing circuit-readable or computer-readable media (represented generally by a non-transitory machine-readable medium 1106.) The bus 1102 may also link various other circuits such as timing sources, peripherals, voltage regulators, and power management circuits, which are well known in the art, and therefore, will not be described any further. The bus interface 1108 provides an interface between bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processing circuit 1104 is responsible for managing the bus 1102 and for general processing, including the execution of software stored on the machine-readable medium 1106. The software, when executed by processing circuit 1104, causes processing system 1114 to perform the various functions described herein for any particular apparatus. Machine-readable medium 1106 may also be used for storing data that is manipulated by processing circuit 1104 when executing software.

One or more processing circuits 1104 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1106. The machine-readable medium 1106 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1106 may reside in the processing system 1114, external to the processing system 1114, or distributed across multiple entities including the processing system 1114. The machine-readable medium 1106 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 1106 may have one or more instructions which when executed by the processing circuit 1104 causes the processing circuit to: receive, from an application, a request to access the input data; determine a coordinate of the input data; determine a status of the requesting application; and grant the request for access to the input data based on the determined coordinate and the status of the requesting application.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A method for searching content, comprising:
   receiving at least one keyword from a client device;
   performing, by a local processor, a first search for content on one or more content servers using the at least one keyword;
   sending a first search result of the first search to a user device for display;
   automatically storing, in a memory communicatively coupled to the local processor, the first search including the at least one keyword;

automatically performing, by the local processor, a subsequent search of the stored first search using at least the stored at least one keyword upon detection of a trigger event, wherein the trigger event comprises an access of a particular content channel by the user device, wherein at least one of the stored keywords is associated with the particular content channel; and automatically sending a subsequent search result of the subsequent search to the user device for display, wherein the subsequent search results comprise content associated with the trigger event, wherein at least some of the content associated with the trigger event was created prior to occurrence of the trigger event.

2. The method of claim 1, wherein the client device and the user device are the same device.

3. The method of claim 1, wherein the client device and the user device are different devices.

4. The method of claim 1, wherein the subsequent search results comprises content associated with the trigger event being added to one or more of the content servers after the trending event.

5. The method of claim 4, wherein the at least the content associated with the trigger event was created prior to occurrence of the trigger event comprises a movie related to the trigger event.

6. The method of claim 1, wherein the trigger event comprises at least one of: the access of the particular content channel or a social network function comprising a post to the social network platform.

7. The method of claim 6, wherein the post is associated with a user profile corresponding to the first search.

8. A method for searching content, comprising:
detecting an access of a particular content channel at a remote user device;
determining, by a local processor, that a trigger event corresponds to the access of the particular content channel;
receiving, from the remote user device, a plurality of keywords associated with the particular content channel;
identifying, by the local processor, one or more previous searches that include one or more of the keywords; wherein the one or more previous searches were previously executed and stored in a memory communicatively coupled to the local processor prior to the detecting;
automatically executing the identified one or more previous searches based on the trigger event, wherein the automatic execution generates subsequent search results; and
providing the subsequent search results for display on a display screen associated with the remote user device.

9. The method of claim 1, wherein the subsequent search results comprises programming content added to a particular content channel after an occurrence of the trending event.

10. The method of claim 8, wherein the identifying comprises:
determining one or more previous searches that were previously executed prior to the detecting that do not include any of the one or more keywords and are not automatically executed.

11. The method of claim 8, further comprising:
automatically displaying the subsequent search result on the display screen.

12. The method of claim 8, wherein the subsequent search results includes programming content added to one or more of a plurality of content servers after the receiving the first search result.

13. The method of claim 11, wherein the automatically displaying comprises displaying at least one or more of the subsequent search results on the display screen while the user is browsing channels.

14. The method of claim 11, wherein the automatically displaying comprises initiating a search screen and displaying at least one or more of the subsequent results in the search screen, wherein the search screen allows a user to enter one or more search terms.

15. The method of claim 12, wherein the programming content is played based upon a user selection of a programming option.

16. The method of claim 12, wherein the programming content comprises a television show, movie, or news event.

17. A non-transitory processor-readable medium having stored therein one or more instructions operational on a client device, which when executed by a processor the instructions cause the processor to perform operations, the operations comprising:
detecting an access of a particular content channel at a remote user device;
determining, by a local processor, that a trigger event corresponds to the access of the particular content channel;
determining a plurality of keywords associated with the particular content channel;
identifying, by the local processor, one or more previous searches that include one or more of the keywords, wherein the one or more previous searches were previously executed and stored in a memory communicatively coupled to the local processor prior to the detecting;
automatically executing, by the local processor, the identified one or more previous searches based on the trigger event, wherein the automatic execution generates subsequent search results; and
providing the subsequent search results for display on a display screen of the remote user device.

18. The non-transitory processor-readable medium of claim 17, wherein the identifying comprises:
determining one or more previous searches that were previously executed prior to the detecting that do not include any of the one or more keywords and are not automatically executed.

19. The non-transitory processor-readable medium of claim 17, wherein at least one of the previous searches includes a search of a plurality of content channels.

20. A system, comprising:
a memory; and
at least one processor coupled to the memory and configured to:
detect an access of a particular content channel;
determine that a trigger event corresponds to the access of the particular content channel;
determine a plurality of keywords associated with the particular content channel;
identify, by the at least one processor, one or more previous searches that include one or more of the keywords, wherein the one or more previous searches were previously executed and stored in the memory prior to the detecting;

automatically execute the identified one or more previous searches based on the trigger event, wherein the automatic execution generates subsequent search results; and provide the subsequent search results for display on a display screen associated with the remote user device.

* * * * *

UNITED STATES PATENT AND TRADEMARK OFFICE
CERTIFICATE OF CORRECTION

PATENT NO. : 10,261,999 B2
APPLICATION NO. : 15/343426
DATED : April 16, 2019
INVENTOR(S) : Funk et al.

It is certified that error appears in the above-identified patent and that said Letters Patent is hereby corrected as shown below:

In the Claims

Column 11, Line 8, please replace "a subsequent search result" with --subsequent search results--.

Column 11, Line 22, please replace "trending event" with --trigger event--.

Column 11, Line 23, please replace "the at least the content" with --the at least some of the content--.

Column 11, Lines 44-45, please replace "one or more of the keywords; wherein" with --one or more of the keywords, wherein--.

Column 11, Line 58, please replace "trending event" with --trigger event--.

Column 12, Lines 1-2, please replace "the subsequent search results includes" with --the subsequent search results include--.

Column 12, Line 3, please replace "after the receiving" with --after receiving--.

Signed and Sealed this
Twentieth Day of August, 2019

Andrei Iancu
*Director of the United States Patent and Trademark Office*